(12) United States Patent
TeGrotenhuis et al.

(10) Patent No.: US 8,438,873 B2
(45) Date of Patent: May 14, 2013

(54) METHODS FOR SEPARATING A FLUID, AND DEVICES CAPABLE OF SEPARATING A FLUID

(75) Inventors: Ward E. TeGrotenhuis, Kennewick, WA (US); Paul H. Humble, Kennewick, WA (US); Dustin D. Caldwell, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1073 days.

(21) Appl. No.: 12/416,924

(22) Filed: Apr. 1, 2009

(65) Prior Publication Data
US 2009/0255290 A1   Oct. 15, 2009

Related U.S. Application Data

(60) Provisional application No. 61/041,285, filed on Apr. 1, 2008.

(51) Int. Cl.
*F25B 15/00* (2006.01)
(52) U.S. Cl.
USPC .............................................. 62/476; 62/495
(58) Field of Classification Search .......... 62/101, 62/324.1, 476, 495, 496
See application file for complete search history.

(56) References Cited

U.S. PATENT DOCUMENTS

| | | | | |
|---|---|---|---|---|
| 3,170,512 | A * | 2/1965 | Smith | 165/110 |
| 4,239,728 | A * | 12/1980 | Stenberg et al. | 422/46 |
| 5,800,595 | A * | 9/1998 | Wright | 95/288 |
| 6,332,913 | B1 * | 12/2001 | Breitschwerdt et al. | 95/55 |
| 6,666,909 | B1 | 12/2003 | TeGrotenhuis | |
| 7,344,576 | B2 | 3/2008 | TeGrotenhuis | |
| 7,434,411 | B2 * | 10/2008 | Drost et al. | 62/101 |
| 2002/0073718 | A1 | 6/2002 | Maisotsenko et al. | |
| 2003/0042009 | A1 | 3/2003 | Phillips | |
| 2006/0016215 | A1 | 1/2006 | Tonkovich et al. | |

OTHER PUBLICATIONS

Buxbaum, R., "Membrane Reactors, Fundamental and Commercial Advantages, E. G. for Methanol Reforming" p. 1-6. No Year.
Muraoka, I et al., "Experimental and Theoretical Investigation of a Capillary Pumped Loop With a Porous Element in the Condenser." p. 1085-1094, 1988.
Smith, R et al., "Process Integration of Separation Systems." p. 161-174. No year.

* cited by examiner

*Primary Examiner* — Melvin Jones
(74) *Attorney, Agent, or Firm* — Frank Rosenberg; Derek H. Maughan (57) ABSTRACT

Methods and apparatus for separating fluids are disclosed. We have discovered that, surprisingly, providing an open pore structure between a wick and an open flow channel resulted in superior separation performance. A novel and compact integrated device components for conducting separations are also described.

17 Claims, 8 Drawing Sheets

METHODS FOR SEPARATING A FLUID, AND DEVICES CAPABLE OF SEPARATING A FLUID

RELATED APPLICATIONS

In accordance with 35 U.S.C. sect. 119(e), this application claims priority to U.S. Provisional Application No. 61/041,285, filed Apr. 1, 2008.

This invention was made with Government support under Contract DE-AC0676RLO1830 awarded by the U.S. Department of Energy. The Government has certain rights in the invention.

FIELD OF THE INVENTION

The present invention relates to methods of desorbing fluids. The invention also relates to devices that are capable of desorbing fluids.

INTRODUCTION

Desorption and phase separation are important processes, and have attracted intense research efforts to improve the efficiency of these unit operations. Much of this research has involved microchannel apparatus in which the short distances for heat and mass transport have made the processes faster and more efficient.

Tonkovich et al. in U.S. Published Patent Application No. US2006/0016216A1 describe a variety of microchannel distillation processes and microchannel distillation apparatus. For example, FIG. 14 of this application illustrates a distillation unit in which a liquid travels through a wick and communication between the liquid and the vapor flow channel is through inlets and outlets in a wall that separates the wick and the vapor flow channel. Tonkovich et al. also describe the use of a structured material with through features in combination with wicks for liquid flow.

In U.S. Pat. No. 6,666,909, TeGrotenhuis et al. describe laminated phase separators and contactors that contain wicking structures for liquid flow and gas flow channels. TeGrotenhuis et al. state that a wick can be a uniform material, a mixture of materials, a composite material, or a gradient material; and that the wick could be graded by pore size or wettability to help drain liquid in a desired direction. Examples of wick materials include sintered metals, metal screens, metal foams and polymer materials such as cellulosic fibers. In this patent, TeGrotenhuis et al. also disclose capture structures that are located in a gas flow channel to assist movement of a liquid into the wick. The capture structure can be a liquid-wetting porous structure having a pore size gradient with pore sizes getting smaller toward the wick.

In U.S. Published Patent Application No. US2007/0193284A1, TeGrotenhuis et al. also describe the use of composite or gradient material, preferably a wicking pore/throat structure in which a liquid flows through the wick and pore throat (a material with a tight pore structure) between the wick and a gas channel to prevent intrusion of the gas stream into the liquid.

SUMMARY OF THE INVENTION

In a first aspect, the invention provides a separator comprising the following elements in the order listed: a heat exchanger; a liquid flow path adjacent to the heat exchanger, wherein the liquid flow path comprises a wick having a first pore size; a vaporizing layer having a second pore size; and a gas flow channel. The first pore size is smaller than the second pore size. Note that the wick and vaporizer layers can be distinct layers (such as stacked screens) or the vaporizer layer can have a gradient of pore sizes from significantly larger at the interface with the gas flow channel to nearly the same size as the wick at the wick's surface.

In some preferred embodiments, the invention, in any of its aspects, can be further characterized by one or any combination of the following additional features: the gas flow channel comprises an open gas flow channel sandwiched between a first liquid flow path and a second liquid flow path; the separator is a laminated device and the gas flow channel and liquid flow path are essentially planar; wherein the gas flow channel has a height of 5 mm or less and the liquid flow path has a height of 5 mm or less; wherein the wick is a screen and the vaporizer layer is a screen; wherein the gas flow channel is a microchannel; wherein the wick has capillary pore sizes in the range of 100 nm to 0.1 mm; wherein the gas flow channel has an open width (with no capture structure or other solid material) of at least 0.13 cm; wherein the cross-sectional area of the gas flow channel is essentially constant over the length of the channel; wherein the cross-sectional area of the gas flow channel is essentially constant over the length of the desorber section; wherein the cross-sectional area of the gas flow channel is essentially constant over the length of the rectifier section; wherein the liquid flow path and the gas flow channel are essentially planar; further comprising a second heat exchanger in thermal contact with the gas flow channel; wherein the device comprises a desorber region and a rectifier region wherein the height of the flow path and/or the height of the wick is different between the desorber region and the rectifier region; wherein, the separator is capable of operating with a heat transfer coefficient of at least 5000 W/K·cm$^2$ when the Co number is greater than 1 and the Bo number is no greater than 0.006 (or other values as described in the Detailed Description section); wherein the separator has a desorption efficiency such that, when an ammonia in water solution (containing 25 mass % ammonia) is passed through the device at a rate of 5.0 mL/s·cm$^2$, vapor from the wick is generated rate of at least 0.003 g/s·cm$^2$; and/or wherein the separator further comprises a gas flow channel outlet and wherein the separator has a desorption efficiency such that when an ammonia in water solution (containing 25 mass % ammonia) is passed through the device at a rate of 5.0 mL/s·cm$^2$, vapor that is generated and passes through the gas flow channel outlet is at least 95 mass % ammonia.

The invention also includes an absorption cycle heat pump comprising any of the separator devices described herein. Similarly, the invention further includes a system where a working fluid is recirculated through any of the separator devices described herein.

The invention also includes a process of separating fluids, comprising: passing a fluid mixture through the liquid flow path of any of the separator devices described herein. In some preferred embodiments, the fluid mixture comprises liquid water, an organic solvent, an alkanolamine, or an ionic liquid. In some preferred embodiments, the fluid mixture comprises ammonia, carbon dioxide, carbon monoxide, hydrogen, hydrogen sulfide, hydrogen peroxide, or a volatile organic compound. In some preferred embodiments, the fluid mixture consists essentially of 2 components; in fact, in each case where the invention is described using the term "comprising," in some narrower embodiments, the invention may be alternatively described as "consisting essentially of" or "consisting of" the stated elements.

In another aspect, the invention provides a process of separating fluids, comprising: passing a fluid mixture into the liquid flow path of a desorber/recitifier; wherein the desorber/recitifer comprises a desorber region comprising a first heat exchanger adjacent to a first wicking region and a gas flow channel, and rectifier region comprising a second heat exchanger adjacent to a second wicking region and the gas flow channel; wherein the fluid mixture comprises a less volatile component and a more volatile component; transferring heat from the first heat exchanger into the first wicking region in the desorber region and wherein at least a portion of the more volatile component vaporizes into the gas flow channel and wherein a portion of the less volatile component also vaporizes into the gas flow channel; wherein the desorber region is oriented with respect to gravity such that liquid in the wick flows downward and fluid in the gas flow channel flows upward; wherein the second heat exchanger is disposed upward, with respect to gravity, of the first heat exchanger that is transferring heat from the heat exchanger into the wick; wherein the second heat exchanger removes heat from the gas flow channel in the rectifier region; wherein at least a portion of the less volatile component in the gas flow channel is captured as a liquid in the second wicking region and flows downward from the second wicking region in the rectifier region into the first wicking region in the in the desorber region; wherein the gas flow channel comprises a continuous open channel extending from the desorber region to the rectifier region. Preferably, the height of the flow path and/or the height of the wick is different between the desorber region and the rectifier region. In another preferred embodiment, the desorber region operates with a heat transfer coefficient of at least 5000 W/K·cm², and wherein the Co number is greater than 1 and the Bo number is no greater than 0.006. Preferably, the fluid mixture enters the desorber at the top of the desorber wick. In some preferred embodiments, the first wicking region has a first geometric surface area (a geometric surface area is the area that can be measured with a ruler, it is does not include internal porosity) and wherein the first heat exchanger transfers heat to the first wicking region over the entirety of the first geometric surface area. In some preferred embodiments, the second wicking region has a second geometric surface area; and wherein the second heat exchanger transfers heat to the second wicking region over the entirety of the second geometric surface area. Preferably, the liquid in the first wicking region increases in temperature as it flows down the first wicking section.

In another aspect, the invention provides a laminated separation device formed from a stack of plates, comprising: a desorber region having a first height; a rectifier region having a second height; a continuous gas flow channel extending in a plane across the desorber region and rectifier region; wherein height is defined as the stacking direction; and wherein the first height is greater than the second height. Height is the dimension perpendicular to the page in FIGS. 1-7. Preferably the height at all points of the desorber region are at least 10% greater (more preferably at least 30% greater) than the height at all points in the rectifier region. In some preferred embodiments, the device further comprises a recuperator section. The invention also includes a method of separating components comprising passing a strong solution into the desorber region. In some preferred embodiments the desorber region comprises a desorber wick having a first height and a gas flow channel having a second height; wherein the rectifier region comprises a rectifier wick having a third height and a gas flow channel having a fourth height; and wherein the first height is greater than the third height; preferably at least 10% greater, more preferably at least 20% greater. In preferred embodiments, the second height is greater than the fourth height. In some preferred embodiments, the desorber region comprises a first desorber wick and second desorber wick disposed on opposite sides of the gas flow channel in the desorber region and a first rectifier wick and a second rectifier wick disposed on opposite sides of the gas flow channel in the rectifier region, and wherein the sum of the heights of the first desorber wick, the second desorber wick, and the gas flow channel in the desorber region, is greater than the sum of the heights of the first rectifier wick, the second rectifier wick, and the gas flow channel in the rectifier region.

The invention also includes a separation system comprising the any of the devices described herein comprising a strong solution in the desorber wick, wherein the device is oriented with respect to gravity such that liquid in the desorber wick flows downward; wherein there is vapor in the gas flow channel and the vapor flows upward, wherein the rectifier region is disposed above the desorber region; wherein at least one desorber inlet is disposed in a wall adjacent to the desorber wick and near the upper side of the desorber wick; and wherein the temperature of the liquid in the desorber wick increases as it flows down the desorber wick.

In a further aspect, the invention provides a laminated device, comprising: a layer made of metal and comprising a first section and capable of conducting a first unit operation; a second section and capable of conducting a second unit operation; and a thermal break separating the first section and the second section; wherein the thermal break comprises a space or a thermally insulating material. During operation of the device, the thermal break does not take part in any unit operations. The thermal break is a significant feature—if the thermal break were replaced by the same metal that is used to form the layer, then, during operation of the device, a substantial amount of heat be conducted between sections. In some preferred embodiments, the first section comprises part of a recuperator and the second section comprises part of a rectifier. In some preferred embodiments, the thermal break comprises a space filled with a gas (the "gas" could be at very low pressure such as in what are conventionally termed vacuums) and wherein the space extends over the entire height of the laminated device, or, less preferably, extends over the height except for the end plates. In some preferred embodiments, the thermal break (or thermal breaks) extends over several layers and extends over at least the layers in which the first section (or first component) and the second section (or second component) are disposed in. In some embodiments, the thermal break (or breaks) occupies at least 10% of the area of each of the layers (where area of a layer is the surface area, such as the area in the plane of the paper in FIGS. 1-7) in which the thermal break (or breaks) is disposed. In some preferred embodiments, the minimum dimension of the thermal break is greater than 1 cm.

Properties and experimental results are disclosed in the description of preferred embodiments and Examples sections. Processes and apparatus of the invention can, alternatively or additionally, be characterized by the properties and results described. For example, methods of the present invention can be described in terms of heat transfer coefficient, or vapor generation rate as a function of device volume or wick area. Similarly, the inventive apparatus can be described as being characterizable by values of heat transfer coefficient, or vapor generation rate as a function of device volume or wick area, if tested according to the conditions described in the Examples.

The invention also includes apparatus and systems (systems are apparatus plus fluids, where the systems can be further defined by the identity of the fluids, the properties of the fluids, and/or the unit operations that the fluids undergo in the apparatus) that incorporate any of the features described herein.

The invention also provides a method and apparatus for the unit operations separation, desorption, stripping, rectification, and recuperation, especially in an cyclic process using a recirculating fluid. Examples of cyclic processes include gas treating using working solutions, such as alkanolamines (e.g. MEA, DEA, MDEA) or ionic liquids, indirect chemical synthesis processes (e.g. hydrogen peroxide or organic peroxide production using working fluids containing ring- or aromatic-structures such as anthraquinone or anthraquinone derivatives), hydrogen storage, and thermodynamic cycles, such as absorption heat pumps. The heat pump is particularly useful in portable cooling systems and for solar cooling where electricity is unavailable and/or when waste heat is available to generate cooling.

The invention also provides a method and apparatus for other processes that require vapor generation from a liquid such as distillation or catalytic distillation, using the separation techniques described herein. In the case of catalytic distillation, the wick may contain a catalyst. The inventive device can be used in extractive distillation; thermochemical compression (heat pump is one application); interstage reboilers; evaporators; boilers; pervaporators; evaporator sections of heat pipes or thermosiphons; evaporators in refrigeration systems (one such example is the Rankine Cycle); stripping organics from waste streams, or recovery of volatile components that are diluted in product streams.

The invention, in various aspects and embodiments can provide numerous advantages including: rapid mass transport, high rates of heat transfer, low cost, durability, highly efficient desorption in a compact space, and increased system performance including increased system energy efficiency.

GLOSSARY OF TERMS

A "capture structure" is a structure disposed (at least partly) within a gas flow channel that assists movement of a liquid into the wick.

"Desorber" is a component that delivers heat to a fluid mixture comprising at least two components of different volatility and produces a vapor stream with higher concentration of at least one higher volatility component and a liquid stream of lower concentration of the at least one higher volatility component. Stripper, partial reboiler, inter-stage reboiler, generator, pervaporator, and evaporator are unit operations that can also be performed with a desorber as defined here.

"Device volume" refers to the entire volume of the device, including channels, headers, thermal breaks and solid material.

"Flow microchannel" refers to a microchannel through which a fluid flows during normal operation of an apparatus.

A "fluid mixture" comprises at least two components, one of which will (at least partially) volatilize to form a gaseous phase in a gas flow channel. Typically, a fluid mixture contains a less volatile component (such as water) and a more volatile component (such as $NH_3$).

A "gas flow channel" contains an open flow path for the flow of gas. Preferably, the gas flow channel does not contain a capture structure which is unneeded for desorption and may contribute to liquid lens formation. In some preferred embodiments, the gas flow channel is an open flow path from an inlet to an outlet with no intervening filters or other materials. Preferably, the gas flow channel is a microchannel.

A "laminated device" is a device having at least two nonidentical layers, wherein these at least two nonidentical layers can perform a unit operation, such as heat transfer, desorption, etc., and where each of the two nonidentical layers are capable having a fluid flow through the layer. In the present invention, a laminated device is not a bundle of fibers in a fluid medium. In preferred embodiments, a laminated device is formed from at least 10 sheets, with each sheet having a thickness of less that 1 cm, preferably less than 5 mm.

A "liquid" is a substance that is in the liquid phase within the wick under the relevant operating conditions.

A "liquid flow path" is a wick (or wicks) or open channel (or channels) or a combination of wicks and open channels through which a liquid flows during operation of a device.

"Mass % ammonia" refers to the mass percent of ammonia in water assuming that the ammonium ions are calculated as ammonia ($NH_3$); in other words, for the purposes of calculating the mass of ammonia in water, assume that all of the ammonium is ammonia.

"Microchannel" refers to a channel having at least one dimension of 5 mm or less, preferably 2 mm or less, in some embodiments 1 mm or less, and in some embodiments 0.1 to 5 mm. The length of a microchannel is defined as the furthest direction a fluid could flow, during normal operation, before hitting a wall. The width and height are perpendicular to length, and to each other, and, in laminated devices, width is measured in the plane of a shim or layer.

"Microcomponent" is a component that, during operation, participates in a unit process operation and has at least one dimension that is 5 mm or less.

"Pore throat" refers to a porous structure having a maximum pore dimension such that a non-wetting fluid is restricted from displacing a wetting fluid contained with the pore throat under normal operating conditions.

Figure 9:
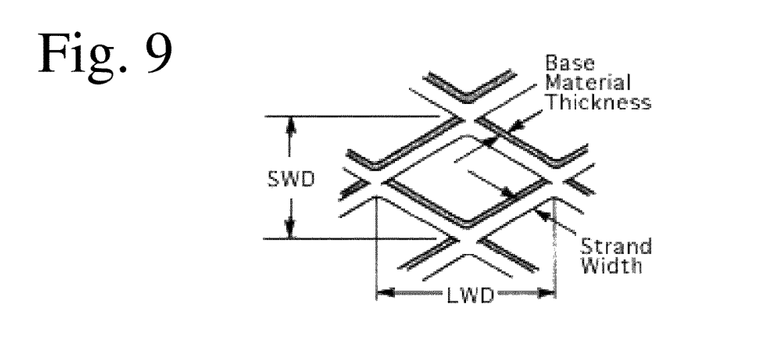
FIG. 9 illustrates a screen that can be used for wick and/or vaporizer layer.

"Pore size" is volume average pore size. This can be measured by known techniques such as optical or electron microscopy, or mercury porosimetry. There is one exception within this definition: for a layered device in which the wick and vaporizer layer consist of screens, "pore size" is defined to be the open area in each screen (SWD×LWD). "SWD" is "short way of the diamond" and "LWD" is long way of the diamond. See FIG. 9.

"Rectifier" is a component that removes heat from a vapor stream comprising at least two components of different volatility and condenses parts of the vapor stream to form a liquid stream with lower concentration of at least one higher volatility component and resulting in the vapor stream having a higher concentration of at least one higher volatility component. Condenser, partial condenser, and inter-stage condenser are unit operations that can also be performed with a rectifier.

"Recuperator" is a heat exchange component that removes heat from one fluid stream at a higher temperature and transfers it to a second stream at a lower temperature.

"Residence time" refers to the time that a fluid occupies a given working volume.

A "strong solution" is a fluid mixture that contains at least two components, one of which is more volatile than the other component, and, in the present invention, the strong solution is the liquid mixture that enters the desorber. It is also the liquid that has a relatively high proportion of the more volatile component.

"Unit process operation" refers to an operation in which the chemical or physical properties of a fluid stream are modified. Unit process operations (also called unit operations) may include modifications in a fluid stream's temperature, pressure or composition.

A "vaporizer layer" is a porous layer on the exterior of a wick. In this invention, the vaporizer layer is disposed between a wick and a gas flow channel. Preferred materials for a vaporizer layer are sintered metals, metal screens, and metal foams.

A "weak solution" is a liquid mixture that contains at least two components, one of which is more volatile than the other component, and, in the present invention, the weak solution is the liquid mixture that exits the desorber. It is also the liquid that has a relatively low proportion of the more volatile component as compared to the strong solution.

A "wicking region" is the volume occupied by a wick, or, a wicking surface such as a grooved microchannel surface.

"Working volume" refers to the total channel volume of the device, and excludes the headers and solid materials including end plate materials.

BRIEF DESCRIPTION OF THE FIGURES

FIGS. 8a and 8b illustrate a desorber device that was used in the Examples.

DESCRIPTION OF PREFERRED EMBODIMENTS OF THE INVENTION

In the devices of the present invention, the primary heat transfer surfaces are the walls between the heat exchangers and the fluid flow paths. Walls between channels in a heat exchanger can act as heat exchange fins, and thus provide extended heat transfer surface area. Walls within a heat exchanger can also provide structural support. For good thermal transport, walls between layers are preferably 500 μm thick or less; in some embodiments in the range of 100 to 500 μm.

Fluid flowing through the heat exchanger channels can be a liquid (for example, water) or a gas. In some embodiments, a fan or blower moves gas through the cooling channels. In some preferred applications of the present invention, it is desired to use a gas as the heat exchange fluid. In this case, the majority of the heat transfer resistance can be in the heat exchange channel. In some embodiments, a configuration with an extended heat transfer surface in the heat exchange channels is preferred.

A wick is a material that will preferentially retain a wetting fluid by capillary forces and through which there are multiple continuous channels through which liquids may travel by capillary flow. The channels can be regularly or irregularly shaped. Liquid will migrate through a dry wick, while liquid in a liquid-containing wick can be transported by applying a pressure differential, such as suction, to a part or parts of the wick. The capillary pore size in the wick can be selected based on the contact angle of the liquid and the intended pressure gradient in the device, and the surface tension of the liquid. Preferably, the pressure differential across the wick during operation should be less than the breakthrough pressure—the point at which gas will intrude into the wick displacing the liquid—this will exclude gas from the wick.

A liquid preferentially resides in the wick due to surface forces, i.e. wettability, and is held there by interfacial tension. Flooding can result from exceeding the flow capacity of the device for wetting phase through the wick. The flow capacity is determined by the fluid properties, the pore structure of the wick, the cross-sectional area for flow, and the pressure drop in the wick in the direction of flow.

The wick can be made of different materials depending on the liquid that is intended to be transported through the wick. The wick could be a uniform material, a mixture of materials, a composite material, or a gradient material. For example, the wick could be graded by pore size or wettability to help drain liquid in a desired direction. Examples of wick materials suitable for use in the invention include: sintered metals, metal screens, metal foams, ceramic or polymeric foams, polymer fibers including cellulosic fibers, or other wetting, porous materials. In some preferred embodiments, the wick comprises a screen, foam, or sintered metal. A screen, especially a metal screen is particularly preferred. The pore sizes in the wick materials are preferably in the range of 10 nm to 1 mm, more preferably 100 nm to 0.1 mm, where these sizes are the largest pore diameters in the cross-section of a wick observed by scanning electron microscopy (SEM). In some preferred embodiments, the wick is, or includes, a microchannel structure. The microchannels can be of any length, preferably the microchannels have a depth of 1 to 1000 micrometers (μm), more preferably 10 to 500 μm. Preferably the microchannels have a width of 1 to 1000 μm, more preferably 10 to 100 μm. In a preferred embodiment, the microchannels are microgrooves, that is, microchannels having a constant or decreasing width from the top to the bottom of the groove. In another embodiment, the microchannels form the mouth to a larger diameter pore for liquid transport.

For wicking materials, the objective is to provide materials that have high permeability and small pore structure, in order to obtain high flow rates while also supporting a significant pressure drop down the wick (the maximum pressure drop decreases with increasing pore size). For devices where liquid phase mass transfer limits processing throughput, the thinness of the wick material is also important for process intensification. Preferably the thickness of a wick is less than 500 micrometers (μm), more preferably less than 100 μm, and in some embodiments between 50 and 150 μm.

In operation of a device with a wick, the wick should not be flooded, and it is preferably not dry. A wet or saturated wick will effectively transport liquid through capillary forces to a low pressure zone, such as low pressure created by suction or other means of creating a pressure differential. The inventive devices can be operated so that liquid flows in the direction of gravity, and gas can flow countercurrent—in this configuration, the devices can operate with or without suction.

Wire screens or punctured foils can be used to form wicks (for purposes of the present invention, punctured foils are defined to be a type of screen). Punctured and punctured/expanded foils provide superior results when used as wicks and/or capture structures in fluid separation apparatus. Particularly preferred foils are UltraThin MicroGrid Precision-Expanded Foils, available from Dexmet Corporation. These materials are made in a flattened form and a 3-dimensional expanded form. Although similar to conventional wire mesh screens, these materials are made from a single thin sheet by punching an array of holes while pulling the material. In the flattened form the holes are an array of diamonds. In the expanded form, the filaments are in a regular tetrahedral configuration. Screens and foils also provide superior results when used to form a vaporizer layer.

Both the flat and expanded foils have been tested for wicking properties as single sheets, in multiple stacked sheets, and with or without a solid backing sheet. In general, the wicking properties are superior to other materials, including conventional woven screens. Qualitatively, the Delker foils appear to have an order of magnitude higher wicking rate than other regular or random porous structures. In addition, the Delker materials can be made in a wide variety of thickness as small as 0.0015 inch (0.038 mm) and from a variety of metals, including copper, aluminum, and nickel.

Fresnel lenses are another preferred form of wick. Wicks having microchannels having depths of less that 100 μm, preferably 50 to 100 μm promote rapid mass transfer.

A wick can also be prepared by laser machining grooves into a ceramic tape in the green state. Such wicks can be made, for example, with grooves less than 50 microns deep with openings less than 100 microns wide. These grooves are expected to have a rectangular shape. Ceramic wicks have a high surface energy, are chemically inert, and have high temperature stability. Another material option is intermetallics formed from two or more metals placed in intimate contact during a bonding process and which combine to form an alloy, compound, or metal solution. Preferred intermetallics will have properties very similar to the ceramic materials. An advantage of engineered structures is fine control of the length-scale for mass transfer in the liquid phase, which is desirable for mass transfer limited applications, such as gas absorption and distillation.

In preferred embodiments of the invention, a vaporizer layer is on the exterior of the wick and is disposed adjacent to a gas flow channel. Preferably, the vaporizer layer is directly adjacent (i.e., in physical contact with and with no intervening materials) both the wick and the gas flow channel. Preferably the vaporizer layer has a larger pore size than the wick. In embodiments in which the wick has a gradient of porosity to aid liquid flow in a desired direction, the vaporizer layer may also have a gradient of porosity in the same direction; the important parameter is that the vaporizer layer has a larger pore size than the wick in a direction perpendicular to liquid flow. The vaporizer layer can be made of the same material (though with larger pore sizes) than the wick. In some preferred embodiments, the vaporizer layer comprises a screen, foam, or sintered metal. A screen, especially a metal screen is particularly preferred.

A surprising discovery of the invention is that the inventive separation devices operate better without a pore throat disposed between the wick and the flow channel. A pore throat was expected to improve the segregation of the gas and the liquid and increase the liquid flow capacity through the device without flooding the wick. For the desorption unit operation, there is no need for a capture structure.

A capture structure can be inserted (at least partly) within the gas flow channel, and in liquid contact with the wick. The capture structure assists in removing (capturing) a liquid from the gas stream. One example of a capture structure are cones that protrude from the wick; liquid can condense on the cones and migrate into the wick—an example of this capture structure is shown in U.S. Pat. No. 3,289,752, incorporated herein by reference. Other capture structures include inverted cones, a liquid-nonwetting porous structure having a pore size gradient with pore sizes getting larger toward the wick, a liquid-wetting porous structure having a pore size gradient with pore sizes getting smaller toward the wick and fibers such as found in commercial demisters or filter media.

Another advantage of some preferred embodiments of the invention is that the gas flow channels and/or liquid flow channels are essentially planar in the fluid separation regions. This configuration enables highly rapid and uniform rates of mass and heat transport. In some preferred embodiments, the gas flow channels and/or liquid flow channels have dimensions of width and length that are at least 10 times larger than the dimension of height (which is perpendicular to net gas flow). In especially preferred embodiments, the devices are made by stacking planar shims (plates) and bonding the stacked shims. Preferably, the shims are less than 1 cm thick, more preferably less than 5 mm thick.

Another optional feature is reduced or non-wettability of one or more walls in the gas flow channel. This could be accomplished, for example, by making this wall of, or coating the wall with, a material that has a reduced or non-wettability for the condensed phase (e.g., a hydrophobic material where water is the liquid phase).

The height of the channels is preferably small for good heat and mass transfer and overall device size, balanced against potentially slower flow rates or higher pressure drops. A high ratio of surface area of exposed wick to volume of gas flow channel is desirable for efficient phase separations. Preferably this ratio is from 1 to 1000 $cm^2$:$cm^3$, and in some embodiments from 5 to 10. The height of the gas flow channels (the distance from the surface of the wick or (if present) optional vaporizer layer to the opposite wall of the gas flow channel is preferably about 10 μm to 5 mm, more preferably 100 μm to 1 mm. In some preferred embodiments, the height of a gas flow channel in the rectifier section is less than the height of the gas flow channel in the desorber section.

Cross-flow heat exchange can be used to provide for heat exchange fluid flow path and less pressure drop; however, in some preferred embodiments, the flow through the heat exchanger is counter-current flow and, in some other embodiments, co-flow. For all the devices described herein, the shims can be repeated for numerous layers, and, in some embodiments, the devices include 2 to 1000, or at least 4, repeating units, where the repeating unit includes shims for desorption (including a wick and gas flow channel) and heat exchange.

In some preferred embodiments there are multiple gas flow channels operating in parallel. This configuration allows high throughput and provides a large surface area to volume ratio for high efficiency. In some preferred embodiments, layers are stacked to have between 2 and 600 layers of gas flow channels, more preferably at least 3 layers of gas flow channels, and in some embodiments, between 3 and 40 layer of gas flow channels. As an alternative to the parallel arrangement, the channels could be connected in series to create a longer flow path.

Another advantage of some preferred embodiments of the invention is that the gas flow channels and/or liquid flow channels can be essentially planar in the fluid separation regions. This configuration enables highly rapid and uniform rates of mass and heat transport. In some preferred embodiments, the gas flow channels and/or liquid flow paths have dimensions of width and length that are at least 10 times larger than the dimension of height (which is perpendicular to net gas flow). In especially preferred embodiments, the devices are made by stacking planar shims (plates) and bonding the stacked shims. Preferably, the shims are less than 1 cm thick, more preferably less than 5 mm thick. Preferably the inventive devices are laminated devices with layers of liquid flow paths and gas flow channels. A particularly preferred desorber region comprises, in order, a optional heat exchanger:wick:vaporizer layer:gas flow channel:vaporizer layer:wick:optional heat exchanger.

In a preferred embodiment, the gas phase is contiguously connected to the gas outlet and the liquid phase is contiguously connected from the liquid flow path to the liquid outlet. The continuity of phases at the gas outlet is affected by the geometry, the total flow and ratio of gas to liquid flow, and the fluid physical properties. A second desired condition is sufficient wicking capacity, which is influenced by the flow area, fluid physical properties, and the permeability of the material.

The separator can be operated with any fluid mixture that comprises at least two components that have differing volatilities under the conditions in the desorber. For example: ammonia and water; ammonia and an ionic liquid; a volatile organic (such as a refrigerant) in a less volatile organic solvent; water and a salt such as LiBr; carbon dioxide ($CO_2$) and a solvent (for example an amine-based absorbent). In general, the fluid mixture (strong solution) flowing into the desorber comprises a more volatile component and a less volatile component; of course there may be a multitude of components in a fluid mixture in addition to the more volatile component and less volatile component, and the multitude of components may have a range of volatilities. Typical examples of more volatile components include: $CO_2$, $H_2S$, $NH_3$, CO, and volatile organics.

The desorber preferably operates with a liquid flow rate through the wick of at least 1.0 mL/s·cm$^2$, more preferably at least 5.0 mL/s·cm$^2$, and in some embodiments 1.5 to 6.5 mL/s·cm$^2$ (where cm$^2$ is the cross-sectional area of the wick in the desorber carrying the liquid flow, and where cross-sectional area is measured perpendicular to liquid flow). The desorber preferably operates with a vapor generation rate of at least 0.001 g/s·cm$^2$, more preferably at least 0.005 g/s·cm$^2$, and in some embodiments up to 0.003 to 0.005 g/s·cm$^2$ (where cm$^2$ is the surface area of the wick in the desorber carrying the liquid flow, and where surface area is measured parallel to liquid flow). The heat transfer coefficient of the desorption process is preferably at least 0.3 W/K·cm$^2$, more preferably at least 0.5 W/K·cm$^2$, and in some embodiments up to 0.7 W/K·cm$^2$.

The heat transfer coefficient is calculated based on wick area and the log mean temperature difference between the desorbing fluid and primary heat transfer surface using the equation:

$$H=q/(LMTD*A)$$

Where H is the heat transfer coefficient, q is heat flux per wick area, LMTD is the log mean temperature difference between desorbing fluid and primary heat transfer wall, and A is the wick area. For the microchannel separator device, the LMTD may be reduced in order to achieve low process energy losses. The LMTD in a given wicking section may be less than <25 C, <10 C, or even <2 C in some cases.

Preferably, the volatile component of the strong solution is selectively desorbed such that the volatile component (or components) are present in the gas flow channel (and more preferably at an outlet from the gas flow channel) in an amount of at least 80 mass %, more preferably at least 95 mass % and still more preferably at least 99 mass %.

In some preferred embodiments, the inventive device is characterized by the convection number, Co, and the boiling number, Bo, which are calculated as $$Co=((1-x)/x)^{0.8}(\rho_g \rho_l)^{0.5}$$

And $$Bo=q/Gi_{g1}$$

Where x is the quality defined as the fraction of mass in the vapor phase in the wick, $\rho_g$ is the gas phase density, $\rho_l$ is the liquid phase density, G is the mass flux of liquid flow feeding the wick (mass flow divided by wick cross-sectional area), and $i_{lg}$ is the heat of vaporization of the vapor generated. The desorber preferably operates with a heat transfer coefficient of at least 500 W/K·m$^2$, more preferably greater than 5000 W/K·m$^2$, and in some embodiments greater than 6000 W/K·m$^2$ when the Co number is greater than 1 and the Bo number is no greater than 0.006, preferably when the Co number is greater than 1 and the Bo number is 0.004 or less, and in some embodiments when the Co number is 1 and the Bo number is 0.004. In some embodiments, the desorber operates with a heat transfer coefficient of 500 to 6700 W/K·m$^2$ when the Co number is 1 and the Bo number is 0.004. The desorber and separation process can be characterized by the heat transfer coefficient measured at the stated Co and Bo values.

In some preferred embodiments, the inventive device is characterized by any of the measurements described in the following Examples section. For example, in some preferred embodiments, the device possesses a desorption efficiency such that, when an ammonia in water solution (containing 25 mass % ammonia) is passed through the device at a rate of 5.0 mL/s·cm$^2$, vapor is generated at a rate of at least 0.001 g/s·cm$^2$, more preferably at least 0.005 g/s·cm$^2$, and in some embodiments up to 0.003 to 0.005 g/s·cm$^2$, and the vapor generated contains at least 80 mass % ammonia; more preferably at least 95 mass % ammonia; and still more preferably at least 99% ammonia (wherein the mass % ammonia is measured at the outlet of the gas flow channel); to determine desorption efficiency, sufficient heat may be added to the desorption wick as needed to accomplish the desired level of vapor generation. The preferred values mentioned above may also be used to characterize desorption efficiency. For example, in some embodiments, a device may be characterized as having the heat transfer coefficients described above in conjunction with the stated convection number and boiling number. Similarly, the device can be characterized by any of the measured values (or at least 30% of the measured values, or from about 40% of the measured value to about 100% of the measured value). In view of the parameters described in these descriptions, skilled engineers can (through routine experimentation) optimize performance over that described in the Examples section.

Integrated Laminated Heat Pump Components

Figure 1:
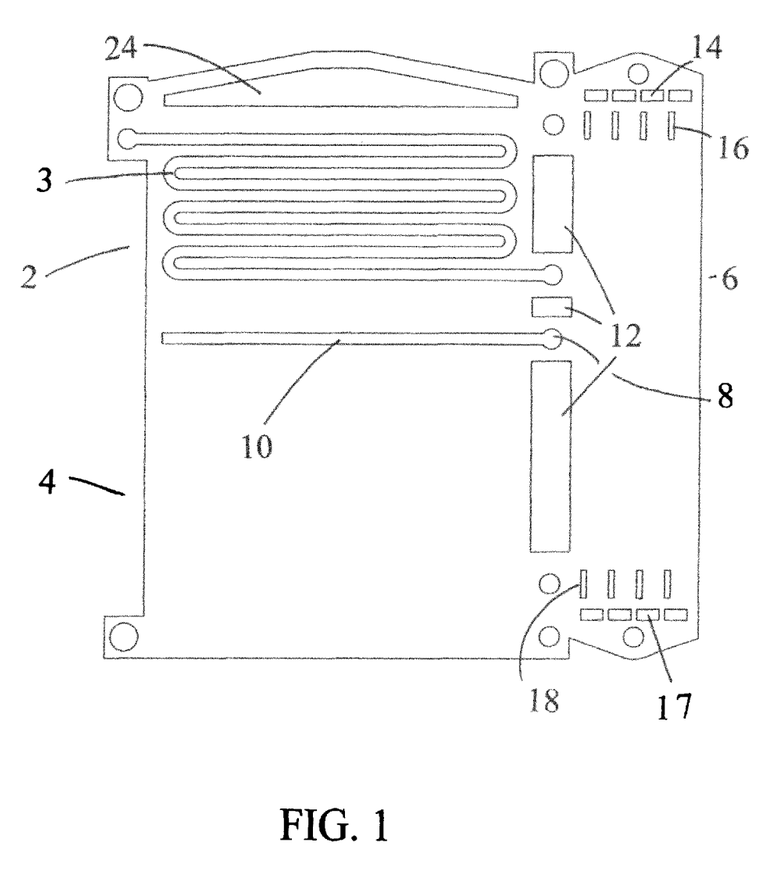
FIGS. 1-7 illustrate sheet designs of an integrated, laminated heat pump components including a desorber, a rectifier, and a heat exchanger.

An integrated device was constructed using shims stacked and bonded in the order: top end plate:A:B:C:D:C:E:F:G:F:G:F:E:C:D:C:B:A:bottom end plate. The end plates (not shown) contain inlets and outlets for the strong solution, weak solution and desorbed vapor. Shim A is shown in FIG. 1. The device has sections for rectifier 2 containing heat exchange channels 3, desorber 4, and recuperator 6. Strong solution for the desorber enters through inlet 8 and into distribution channel 10. Each shim including the end plates contain thermal breaks 12 which are empty spaces typically filled with air. The recuperator section contains header holes 14 for a first fluid, outlets 18 for a first fluid, header holes 17 for a second fluid, and outlets 16 for a second fluid. Gas outlet channel 24 can be seen at what is typically the top of the device (relative to gravity).

Figure 2:
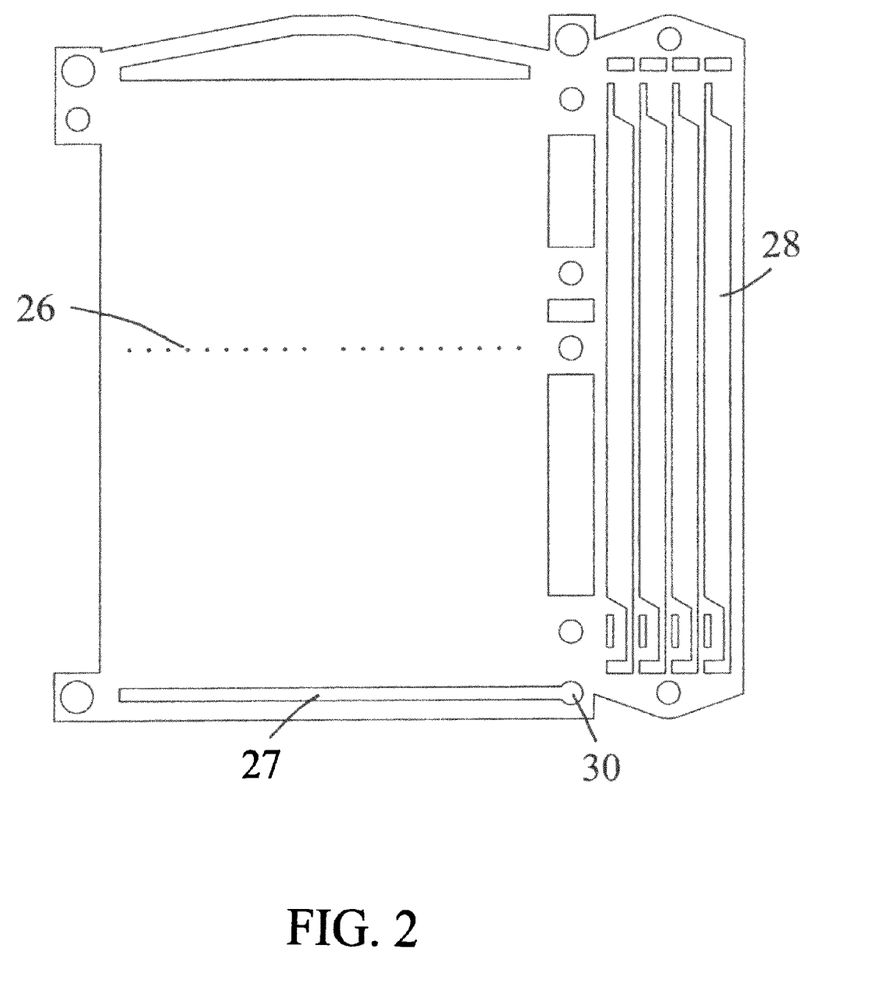

Shim B is shown in FIG. 2. This sheet contains desorber distribution holes 26; flow channels 28 for the second fluid; and liquid channel 27 and liquid outlet 30 for the weak solution. The strong solution flows through the distribution holes into the adjacent desorber wick.

The strong solution is heated using external heat exchange structures (not shown) attached to the end plates. These external heat exchangers are only applied to those portions of the end plates corresponding to the lower (desorption) section of the device.

Figure 3:
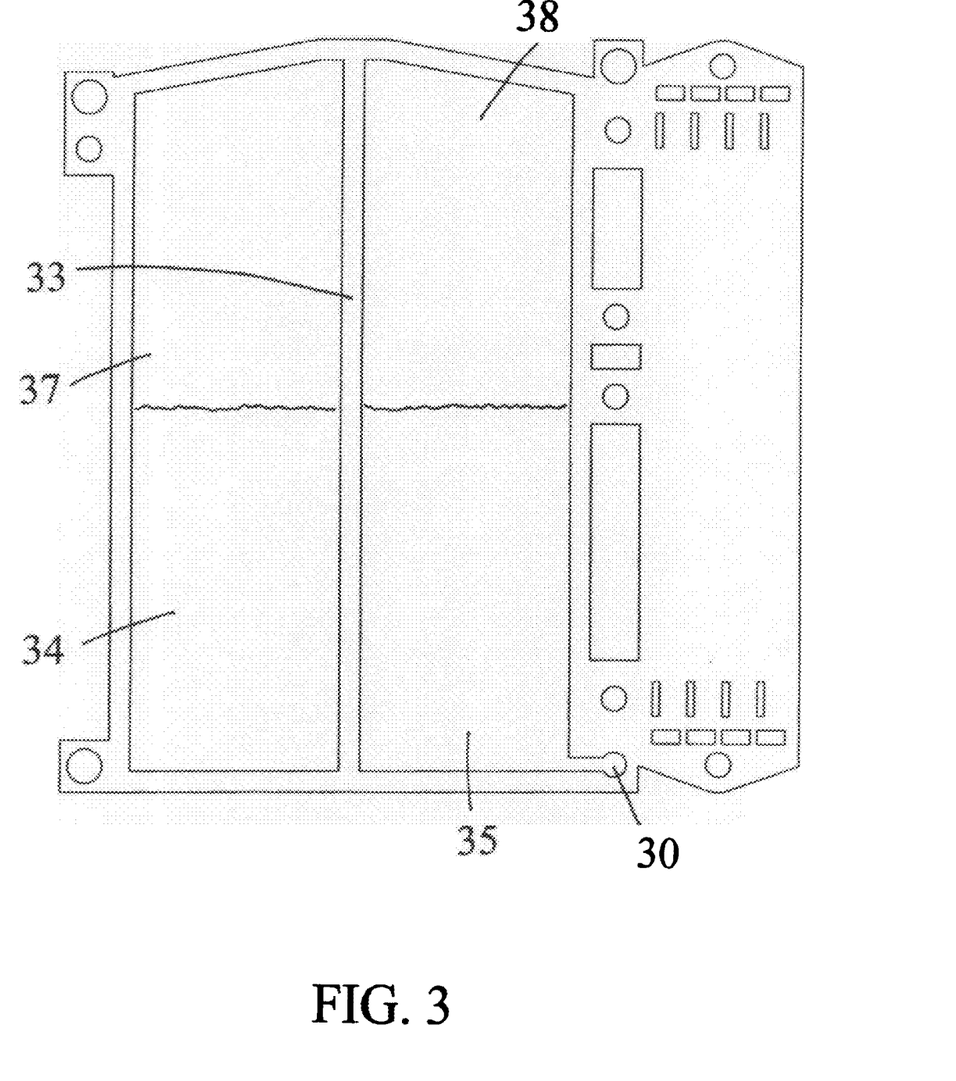
Figure 4:
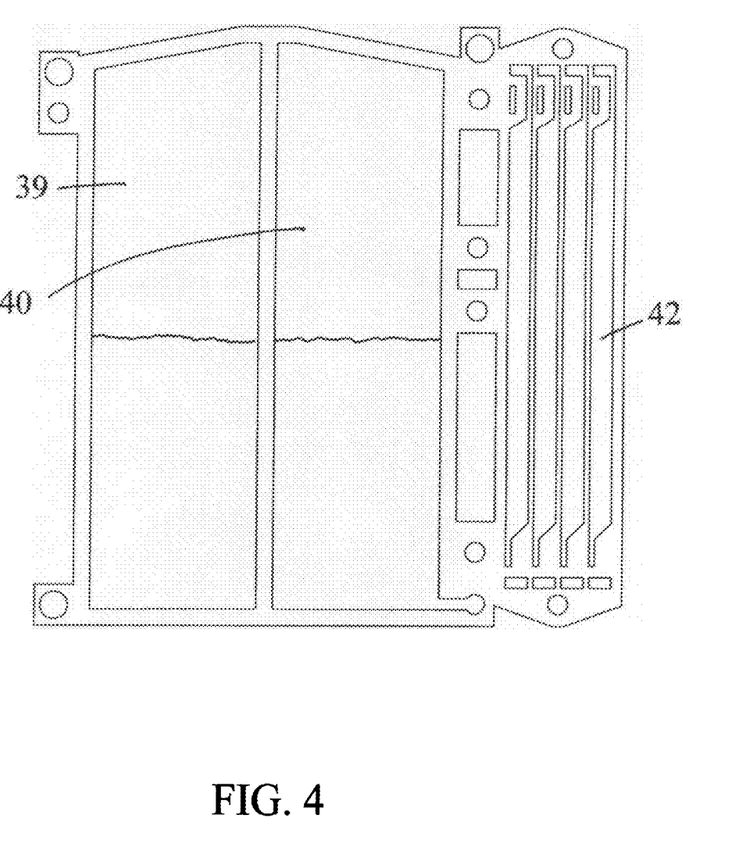
Figure 5:
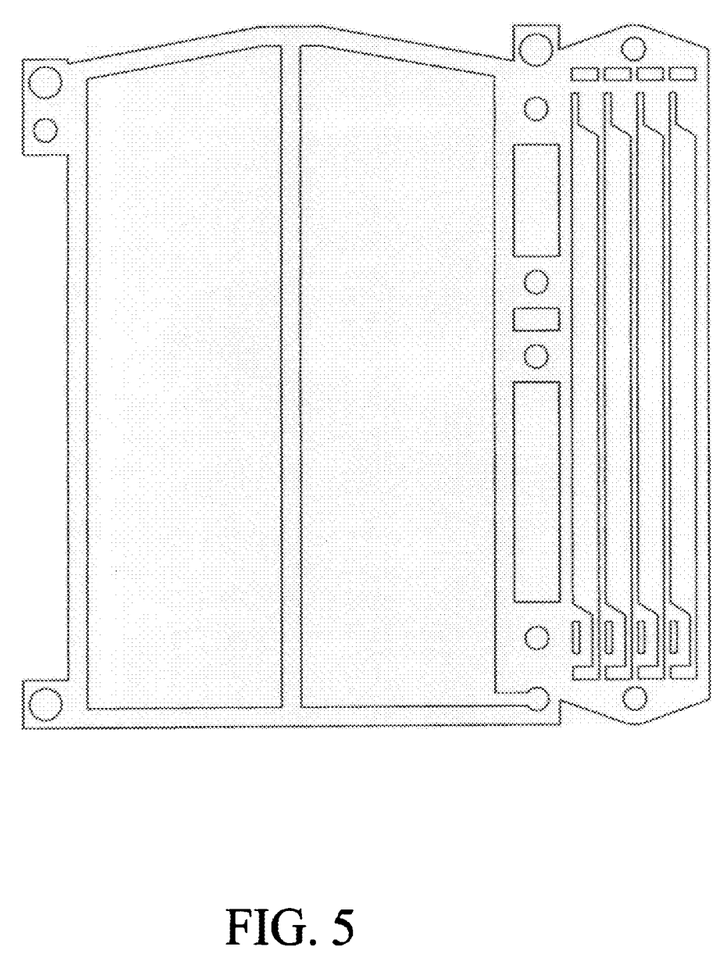
Figure 6:
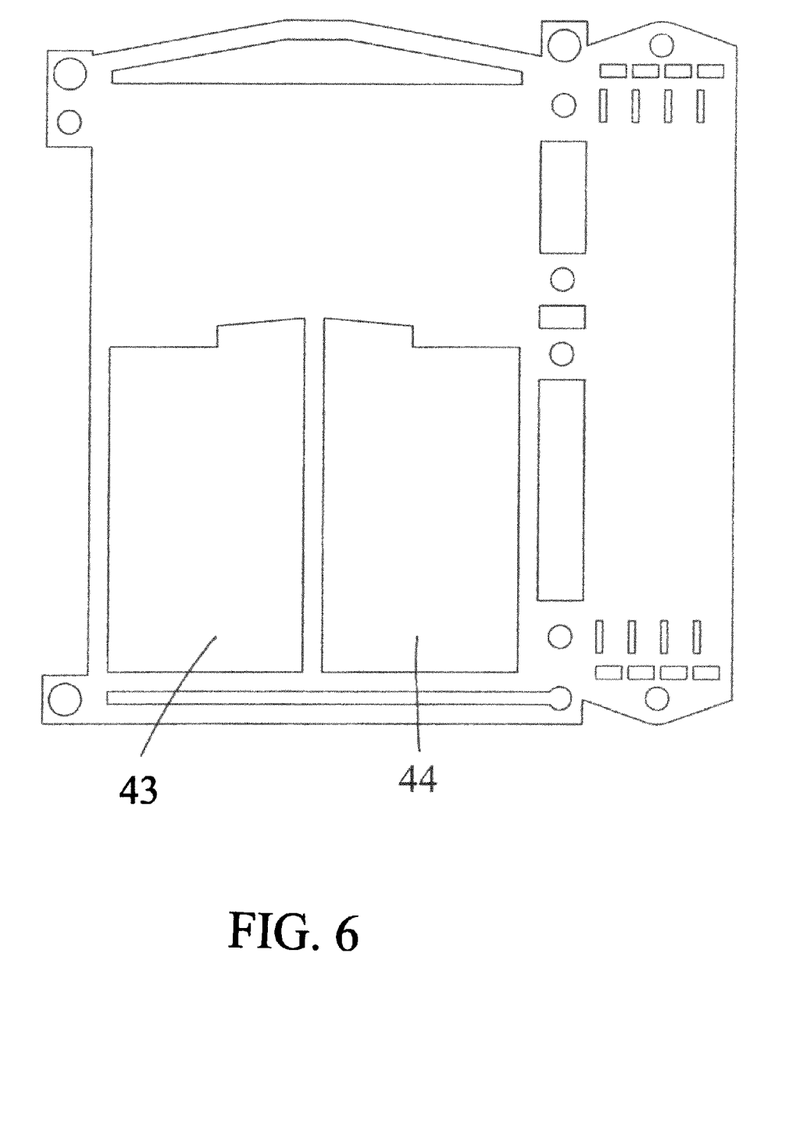

Shim C is shown in FIG. 3. The shim contains open spaces which are separated by support rib 33. Desorber wicks fill the lower open spaces 34, 35, and rectifier wicks are disposed in the upper open spaces 37, 38. Shim D is shown in FIG. 4. In this layer, there are open spaces 39, 40. Fluid pathway 42 is a channel for passage of fluid 1 through the heat exchanger. Fluid 1 and fluid 2 are the strong solution entering the device and the weak solution exiting the device. Liquid flows down the desorber wick toward outlet 30. Gas evolved from the desorber wick is released into the open gas channel and flows upward into the rectifier section.

A second shim C is on the other side of shim D and there is a continuous open gas channel in the second shim C. Shim E (FIG. 5) is disposed adjacent to shim C so that desorber wicks (as well as rectifier wicks) are disposed on either side of a gas flow channel.

Shim F (FIG. 6) contains open spaces 43, 44. Shim G (FIG. 7) has open spaces 46, 48 in the desorber region. In the rectifier section, the strong solution flows through serpentine channel 50. The strong solution enters through inlet 52, is heated in channel 50 and exits through outlet 54. As water condenses into the rectifier wick and the resulting heat passes into the strong solution.

When operated as an integrated desorber, rectifier and recuperator of an absorption cycle heat pump, strong solution from the absorber is pumped to high pressure and enters the device through inlet header hole 52, then through the rectifier channels 3 and 50 and out header hole 54. The strong solution is directed from outlet header hole 54 to inlet header holes 14, through channels 42, and out header holes 18. Strong solution flows from outlet header holes 18 are directed to the desorber section inlet header hole 8. The strong solution preferentially gives up the more volatile component to the vapor phase in the desorber section and exits as the weak solution from outlet header hole 30. The weak solution from outlet header hole 30 is directed to inlet header holes 17, through channels 28 and out header holes 16. The weak solution is throttled to lower pressure before being fed to the absorber of the heat pump. Vapor generated in the desorber section 4 flows into the vapor channels of the rectifier section 2 where it is cooled. A portion of the vapor is condensed to a liquid in the rectifier section 2 which flows back into the desorber section 4. The remaining vapor exits the device through the outlet header 24 and flows to the condenser of the absorption cycle heat pump.

The integrated device can be scaled up to higher flow rates by repeating the stacking order A:B:C:D:C:E:F:G:F:G:F:E:C:D:C:B:A separated by heat exchangers that provide heat to the desorber section 4. The heat exchangers (not shown) can be designed for heating with a liquid stream or can have extended heat transfer area to enhance the heat transfer coefficient for heating with a hot gas stream. The heat exchangers can be designed for co-flow, counter-flow, cross-flow, or multi-pass relative to the flow of liquid in the desorber wicks.

A preferred embodiment is for the width of a desorber channel comprising two desorber wicks and desorber vapor channel to be greater than the width of a rectifier channel comprised of two rectifier wicks and a rectifier vapor channel. The rectifier performance is constrained by the convective heat transfer coefficient in the rectifier vapor channel and is reduced by the thermal resistance of the rectifier wicks that are part of the heat transfer pathway. Enabling the width of the rectifier channels to be narrower than the desorber channels reduces the heat transfer area required for the rectifier and results in a smaller rectifier section and a smaller integrated device.

The integrated device comprised of stacking order A:B:C:D:C:E:F:G:F:G:F:E:C:D:C:B has a desorber channel width that is the sum of layer thicknesses C+D+C+E+F+G+F+G+F+E+C+D+C. The rectifier channel is the sum of layer thicknesses C+D+E+F. In one preferred embodiment, each of these layers is 0.0254 cm to give a total desorber channel width of 0.33 cm and a total rectifier channel thickness of 0.10 cm. In one preferred embodiment, the desorber wicks (plus the vaporizer layer height) are each about 0.10 cm in height and the rectifier wicks are each about 0.03 cm in height. In this preferred embodiment, the desorber vapor channel is about 0.13 cm in height and the rectifier vapor channel is about 0.04 cm in height. In some preferred embodiments, the wicks are 0.2 cm in height or less and the gas flow channel is 0.2 cm in height or less in the desorber region and, preferably, the height of the gas flow channel in the rectifier region is no more than one half the height of the gas flow channel in the desorber region. Typically (but not necessarily), wicks and gas flow channels have a constant height over the length of each region.

An important aspect of the inventions is the width of the desorber vapor channel relative to the size of the openings in the vaporizer layer to avoid liquid bridges forming that span across the vapor channel from on desorber wick to the opposing desorber wick or from the desorber wick to the opposing solid wall. Bridges are formed from liquid drops ejected from the wicks during the desorption process. The drops are normally no larger than the smallest dimension of the openings in the vaporizer layer. Desorber vapor channels having widths at least as large as the smallest dimension of the vaporizer openings preclude ejected drops from forming bridges. In preferred embodiments, the vapor channel dimension is at least as large as the smallest dimension of the vaporizer layer opening, and in more preferred embodiments, the vapor channel dimension is at least 2 times the smallest opening of the vaporizer layer. In one preferred embodiment, the smallest dimension of the vaporizer layer opening is 0.13 cm and the vapor channel width is at least 0.13 cm. For screens, the opening is the SWD (see FIG. 9)

An important aspect of the invention is the counter-flow of liquid and vapor in the desorber section 4. The liquid increases in temperature and decreases in concentration of the more volatile component as it flows through the desorber section. The vapor flowing in the opposite direction last encounters the liquid entering the desorber section at a colder temperature and higher concentration of the more volatile component. This enables the desirable outcome of having the vapor exit the desorber section 4 also at a colder temperature and higher concentration of the more volatile component than if the vapor flowed co-current with the liquid.

Another important aspect of the invention is enabling the condensed liquid from the rectifier section to flow to the inlet end of the desorber section. The condensed liquid normally has a higher concentration of the more volatile component than either the strong solution or the weak solution. Consequently, recycling the rectifier condensate back through the desorber section increases the fraction of the more volatile component that exits in the vapor stream from outlet header 24.

When operating the invention in the mode of an integrated desorber, rectifier, and recuperator of an absorption heat pump, the coefficient of performance (COP), defined as the evaporator heat duty divided by the desorber heat duty, is increased by the counter-flow desorber section and by recycling the rectifier condensate back through the desorber section. In one preferred mode of operation, the COP of an ammonia-water absorption cycle heat pump is increased by at least 0.05, and more preferrably by at least 0.1, and by as much as 0.15.

Figure 7:
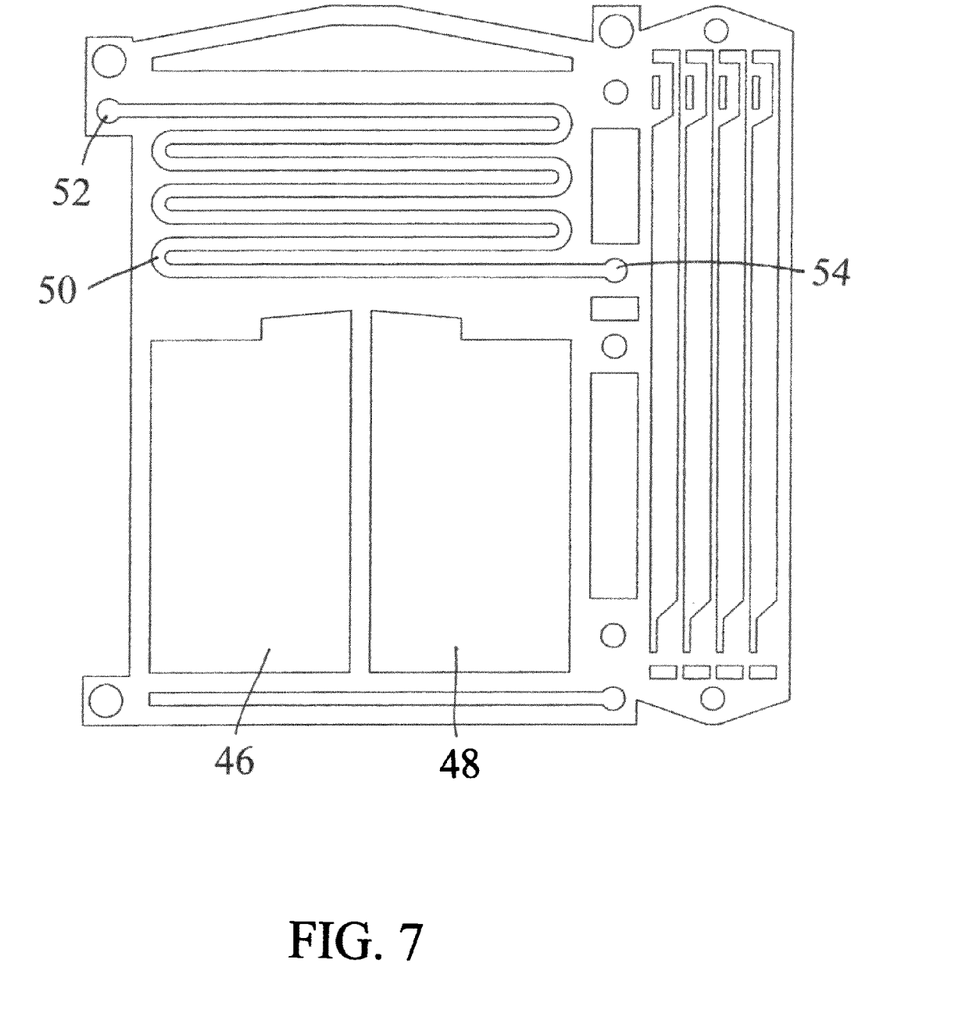

In one preferred mode of operation, the strong solution enters the device through inlet hole 3 at approximately 80° C.; exits the rectifier heat exchange channels through outlet hole 54 at approximately 95° C.; and exits the recuperator section through holes 18 at approximately 150° C. The weak solution exits the desorber section 4 through exit hole 30 at about 180° C. and from the recuperator section 6 through outlet holes 16 at approximately 98° C. The temperature differences between the recuperator section 6 and the desorber and rectifier sections 2 and 4, respectively, results in undesirable heat conduction between the sections. The thermal breaks 12 are designed to reduce heat conduction between the sections.

When operating the desorber section as a reboiler of a distillation process, the counter-flow of vapor and liquid in the desorber section 4 enables greater fractional distillation of the more volatile component or components than a conventional continuously mixed boiling process. In one preferred mode, the desorber section 4 provides multiple stages of separation equivalent to more than one equilibrium tray of a conventional tray distillation process. Distributing the heat input over the entire area of the desorber section is analogous to adding interstage boilers in conventional adiabatic distillation which is known to increase energy efficiency of the separation process.

When operating the rectifier section as a rectifier of a distillation process, the counter-flow of vapor and liquid and the distribution of cooling over the entire rectifier section area is analogous to providing interstage cooling to an adiabatic distillation process, which is also known to increase energy efficiency of the separation process.

EXAMPLES

Figure 8:
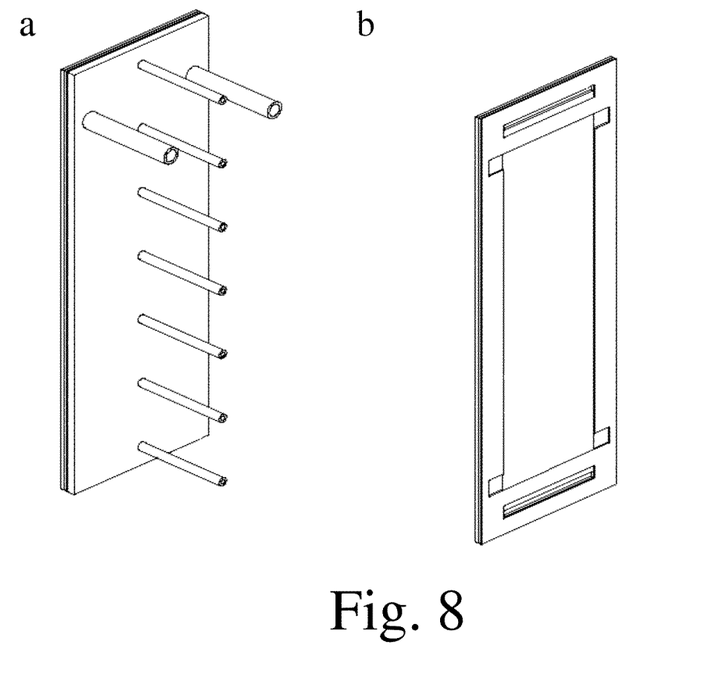
FIG. 8(a) illustrates a single channel laminated desorber.
FIG. 8(b) illustrates the laminated desorber with top plate removed.

Single Channel Desorption experiments were conducted using a stacked shim, brazed stainless steel device. The overall dimensions of the single channel desorber are 17 cm long, 6 cm wide and 0.7 mm thick. FIG. 8*a* shows the single channel desorber, and FIG. 8*b* shows a view of this device with the top plate removed.

In FIG. 8*a* the two larger diameter tubes at the top of the device are the ammonia vapor exit they attach into the vapor channel above the wick. The small tube at the top of the device is the strong solution (solution with volatile component) entrance, and the small tube at the bottom of the device is the weak solution (solution depleted in the volatile component) exit. The other tubes on the device are for thermocouple probes to measure the temperature profile inside the device. With the top plate removed the internal structures are revealed. The rectangular feature at the top of the device is the strong solution header; the rectangular feature at the bottom is the weak solution header. The central portion of the device contains the wick attached to the front side of the heat transfer surface; above the wick is an empty space that constitutes the vapor channel. The exposed wick area (used to calculate heat and mass transfer) is 14 cm by 5 cm. The device was heated using a gasketed clamped on heat exchange structure, attached to the back side of the primary heat transfer surface. The heat exchanger contains 12 flow channels that are each 3.23 mm wide by 1 mm deep and run the length of the device.

At the top and bottom of the heat exchange channels were rectangular inlet and outlet headers for the heat transfer fluid. An O-ring groove surrounds the heat transfer channels and headers. A polymeric O-ring is placed in the grove and the device clamped together to compress the O-ring and seal the heat exchange fluid.

During single channel desorber experiments a water-propylene glycol mixture was used as the heat transfer solution (flowing through the heat exchanger). The temperature of fluid entering the heat exchanger ranged from 50 to 80° C. The temperature inside the desorber was measured using thermocouple probes inserted into the inlet and outlet tubes of the device, as well as tubes along the desorbers length.

Experiments were conducted at atmospheric pressure. Ammonium hydroxide with a concentration in the range of 25-29 wt % was used as the feed (strong) solution. The feed solution was input into the device using a pump at flow rates ranging from 15 to 100 mL/min. The solution entering the desorber as well as the weak solution exiting the desorber was weighed. The density of these solutions was also measured using an Anton Paar model DMA 4500 density meter. These density measurements were converted into concentrations using property correlations for ammonia-water solutions. The amount of ammonia vapor generated was calculated using a mass balance with these mass and concentration measurements as input. The heat transfer was calculated using the mass balance and temperature measurements using correlations to calculate the enthalpy of input and outlet streams. The heat transfer coefficient for the desorption process was calculated using these heat transfer values along with a heat transfer coefficient for the heat exchange structure calculated from proven correlations. The same heat exchange structure and heat transfer solution flow rate were used in all experiments. In this situation the differences in performance can be attributed to the wicking structure used in the desorber.

In testing, the single channel desorber was run until steady operation was achieved and temperatures and flow rates appeared stable. At this point the measurements were started; the outlet liquid was collected and weighed as well as the mass of strong solution fed into the desorber. The temperatures of all streams entering and exiting the device were logged. The experiments were run from 3 to 5 min without changing settings. At the end of the experiment the density of the exiting fluid measured. The exiting solution container was covered and cooled to prevent the escape of ammonia vapor outside the desorption process.

Some experiments were conducted in a single channel device with a sapphire window top plate. This device is a smaller version of the single channel unit described. The sapphire device uses wicks with an area of 4.4 cm×7.5 cm. This device also used a bolt on heat exchange structure, with channel widths and heights identical to those previously described.

The major objective of the desorption experiments was to maximize the amount of ammonia produced (desorbed) per wick area (device size). Flow capacity is enhanced in wicks that have high internal porosity (large internal pores) and a tight surface pore structure that will sustain a large pressure difference between the vapor and liquid in the wick for maximum pumping pressure. The best structure for high flow rate was expected to be large opening screens against the heat transfer wall and a tight screen structure on top adjacent to the vapor channel.

Heat transfer is expected to be enhanced with wicks having higher thermal conductivity and higher wire surface area for boiling assuming the wick stays wet. Lower porosity, tighter structures would be expected to give better heat transfer.

Wick Materials

Two different Dexmet expanded metal screens along with a fine G Bopp & Co woven wire screen were used to construct the sample wicks:

1. Very tight structure: Bopp SDS 65/20

2. Tight structure: Delker 4 SS 5-050

3. Open structure: Delker 4 SS 12-189

The Bopp SDS 65/20 is made from 0.0008" (0.02 mm diameter) wire woven into a mesh with 300×300 openings per inch. An explanation of the product codes (see FIG. 9) used to describe the Delker meshes is provided:
Example: 4 SS 5-050
First number represents nominal original thickness
4=0.004" (0.1016 mm)
Letters are chemical symbol for material
SS=Stainless steel
Number immediately following letters represents strand width
5=0.005" (0.13 mm)
Last number indicates the long way of the diamond
050=0.050" (1.27 mm)

The Bopp SDS 65/20 mesh was about 0.001" (0.025 mm) thick with 0.0026" openings. The 4 SS 5-050 mesh was approximately 0.004" thick and had a much tighter pore structure compared to the 4 SS 12-189 mesh that was approximately 0.020" thick. For the Delker materials the SWD depends on how much the mesh is pulled. In the meshes used the SWD was about ½ the LWD. The 4 SS 5-50 has approximately 600 openings per square inch, while the 4 SS 12-189 has around 60. The Bopp SDS 65/20 has 90,000 openings per square inch Wicks composed of altering layers of these mesh materials were tested in terms of flow capacity, heat transfer performance, and phase separation. The following examples illustrate the performance of several wicking structures tested.

Example 1

Originally, we believed that the best performance would be seen with a structure that maximized liquid flow. Several wicking structures were tested in a single channel desorber for flow characteristics without heating. The best flow performance was seen using a wick with the meshes in the following order:
Heated Wall-1-2-3-2-1-Vapor channel Using this wicking structure liquid flow rates as high as 100 ml/min were achieved with the device in a horizontal position. However, when the device was heated and ammonia vapor generated stable operation could not be achieved at liquid flow rates higher than 8 ml/min. The problem was that vapor was retained in the wicks due to the very tight Bopp SDS 65/20 mesh used at the vapor/liquid interface.

Example 2

Initial testing focused on increasing flow rate and heat transfer. The best flow rate and heat transfer was observed using a 5 layer wick consisting of Delker MicroGrid® meshes in the following order:
Heated Wall-2-3-2-3-2-Vapor channel This wick had good performance in terms of liquid flow capability and heat transfer. The maximum liquid flux through the wick oriented horizontally (no liquid breakthrough into the vapor channel) was 40 ml/min for 1.3 mm thick wick in a device 5.5 cm wide×14.5 cm long. Higher liquid flow rates up to 90 ml/min were achieved with the device in a vertical orientation. The heat transfer coefficient for the liquid filled wick was estimated as 0.4 W/cm²K.

This wicking structure had a tight mesh at both the primary heat transfer surface and vapor liquid interface. At the time it was believed a tighter structure (but not too tight) at the liquid vapor interface was desirable to minimize liquid entrainment in the vapor. However, the experimentally observed failure mechanism for the process was vapor entrainment in the exiting liquid. Therefore, this wick was not effective at segregating the phases when vapor generation rates exceeded 3-4 g/min in the testing device.

To better understand the physics of the process, a device with a sapphire window was used to test several wicking structures. Testing in this device using a wick similar to the one previously described showed an unexpected chaotic and violent process where vapor formed deep in the wick (next to the primary heat transfer surface) forced (shot) liquid drops from the wick. These drops would create liquid lenses between the wick and the opposing vapor channel wall. The lenses would coalesce into larger drops that would eventually fill large portions of the vapor channel. This resulted in pressure fluctuations as vapor bubbles formed at the far end of the vapor space coalesced until they were able to break free and leave through the vapor outlet. This chaotic process resulted in significant liquid entrainment in the exiting vapor. Unexpectedly, a tighter mesh at the vapor liquid interface increased liquid entering the vapor channel. Prior to this work, was not known that a tighter mesh at the liquid vapor interface could result in increased liquid entering the vapor channel.

Example 3

A wick composed of three layers of Delker 4 SS 12-189 was tested in the sapphire window device. The device configuration was as follows:
Heated Wall-3-3-3-Vapor channel This loose wicking structure did not have good flow or heat transfer properties. When run liquid would quickly fill up the vapor channel, making stable operation impossible. This example shows the necessity of having a graded wicking structure that holds liquid next to the primary heat exchange surface.

Example 4

A wick composed of two layers of 4 SS 12-189 and one layer of 4 SS 5-050 next to the primary heat transfer surface was tested in the sapphire window device.
Heated Wall-2-3-3-Vapor channel This wick performed well. The desorption process was much calmer with no evidence of liquid being ejected from the wick. This wick did not have flow characteristics as good as the previously described 5 layer wick, but it did provide the highest heat transfer coefficient (0.6 W/cm² K), vapor generation rate and least liquid ejection. Using this wick in a single channel desorber stable operation was achieved with liquid flow rates as high as 50 ml/min and vapor generation rates around 4 g/min.

It is believed that the looser meshes at the vapor liquid interface are required to trap liquid drops ejected close to the primary heat transfer surface. In this sense a graded wicking structure that is tight near the heat transfer surface and looser at the vapor liquid interface minimizes the amount of liquid ejected from the wick. This type of structure is superior to a thin tight wick or a thicker loose wick.

Flow rate of strong solution through the desorber wick is preferably at least 2 mL per second per cm² (wick cross section).

Desorber Design

In working with the sapphire window device it was also shown that liquid lenses in the vapor channel could be eliminated by using vapor channels at least 0.05" (0.13 cm) in width (distance between wick and wall or between wicks) in conjunction with the with the 2-3-3 wick. This thickness was large enough such that liquid droplets that were expelled from the wick are too small to form lenses capable of bridging the vapor space. The required vapor channel width is likely to be a function of wick geometry since wick geometry will impact droplet size. Thus, in preferred embodiments of the invention, the gas flow channel has a width of at least 0.10 cm, more preferably at least 0.13 cm.

An innovation used in the final integrated wicking desorber design was to incorporate opposing wicks with a vapor channel width large enough to prevent bridging liquid lenses. In this case small liquid droplets that are expelled from one wick will contact the opposing wick where they reabsorb, further minimizing liquid entrainment in the vapor. With these innovations, an opposing wick design with vapor channel dimensions large enough to prevent bridging, along with a wick having a tight mesh at the primary heat transfer surface and loose mesh at the liquid vapor interface, superior desorption performance was achieved.

We claim:

1. A separator comprising the following elements in the order listed:
    a heat exchanger;
    a liquid flow path adjacent to the heat exchanger;
    wherein the liquid flow path comprises a wick having a first pore size;
    a vaporizing layer having a second pore size; and
    a gas flow channel; and
    wherein the first pore size is smaller than the second pore size.

2. The separator of claim 1 wherein the gas flow channel comprises an open gas flow channel sandwiched between a first liquid flow path and a second liquid flow path.

3. The separator of claim 1 wherein the separator is a laminated device and the gas flow channel and liquid flow path are essentially planar.

4. The separator of claim 3 wherein the gas flow channel has a height of 5 mm or less and the liquid flow path has a height of 5 mm or less.

5. The separator of claim 2 wherein the wick is a screen and the vaporizer layer is a screen.

6. An absorption cycle heat pump comprising the separator of claim 1.

7. The separator of claim 2 wherein the gas flow channel is a microchannel.

8. The separator of claim 2 wherein the wick has capillary pore sizes in the range of 100 nm to 0.1 mm.

9. A process of separating fluids, comprising:
    passing a fluid mixture into the liquid flow path of the separator of claim 1.

10. The process of claim 9 wherein the fluid mixture consists essentially of 2 components.

11. The process of claim 9, wherein the fluid mixture comprises liquid water, an organic solvent, an alkanolamine, or an ionic liquid.

12. The separator of claim 1 wherein the gas flow channel has an open width (with no capture structure or other solid material) of at least 0.13 cm.

13. The separator of claim 1 wherein the area of the gas flow channel is essentially constant over the length of the channel.

14. The separator of claim 1, wherein the liquid flow path and the gas flow channel are essentially planar.

15. The separator of claim 1 further comprising a second heat exchanger in thermal contact with the gas flow channel.

16. A process of separating fluids, comprising:
    passing a fluid mixture into the liquid flow path of the separator of claim 15;
    wherein the fluid mixture comprises a less volatile component and a more volatile component;
    transferring heat from the heat exchanger into the wick in a desorber region and wherein at least a portion of the more volatile component vaporizes into the gas flow channel and wherein a portion of the less volatile component also vaporizes into the gas flow channel;
    wherein the desorber is oriented with respect to gravity such that liquid in the wick flows downward and fluid in the gas flow channel flows upward;
    wherein the second heat exchanger is disposed upward, with respect to gravity, of the heat exchanger that is transferring heat from the heat exchanger into the wick;
    wherein the second heat exchanger removes heat from the gas flow channel in a rectifier region;
    wherein the second heat exchanger is adjacent to a second wick;
    wherein at least a portion of the less volatile component in the gas flow channel is captured as a liquid in the second wick and flows downward from the second wick in the rectifier region into the wick in the in the desorber region;
    wherein the gas flow channel comprises a continuous open channel extending from the desorber region to the rectifier region.

17. The process of claim 16 wherein a gas outlet is disposed upward of the rectifier region and the gas flow channel is an open channel extending from the desorber region to the gas outlet.

* * * * *